Figure 1:
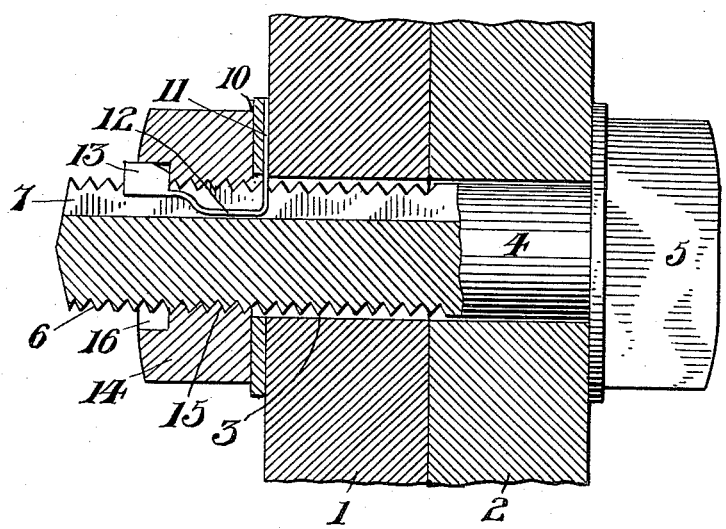

A. D. MILLER.
NUT LOCK.
APPLICATION FILED DEC. 4, 1911.

1,024,274.

Patented Apr. 23, 1912.

WITNESSES

INVENTOR
Andrew D. Miller
BY
ATTORNEYS

UNITED STATES PATENT OFFICE.

ANDREW D. MILLER, OF JOHNSTOWN, PENNSYLVANIA.

NUT-LOCK.

1,024,274. Specification of Letters Patent. Patented Apr. 23, 1912.

Application filed December 4, 1911. Serial No. 663,690.

*To all whom it may concern:*

Be it known that I, ANDREW D. MILLER, a citizen of the United States of America, residing at Johnstown, in the county of Cambria and State of Pennsylvania, have invented certain new and useful Improvements in Nut-Locks, of which the following is a specification, reference being had therein to the accompanying drawing.

This invention relates to a nut locking device, and the objects of my invention are to provide simple and effective means, in a manner as will be hereinafter set forth, for locking a nut upon a bolt, whereby the nut cannot become accidentally displaced, and to provide a nut locking device that can be advantageously used in connection with rolling stock, bridges, rail joints and structures subjected to vibrations that have a tendency to displace nuts relatively to bolts.

Other objects of my invention are to provide a strong and durable nut locking device that can be installed by unskilled labor, and to accomplish the above results by a mechanical construction that permits of the nut being manually removed when it is desired to separate or disassemble the material held by the bolt and nut.

With the above and other objects in view, the invention resides in the novel construction, combination and arrangement of parts to be hereinafter specifically described and then claimed.

Reference will now be had to the drawing, wherein:—

Figure 2:
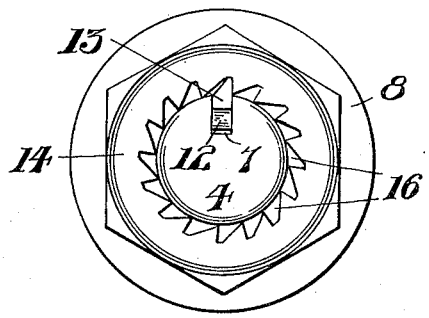
Figure 3:
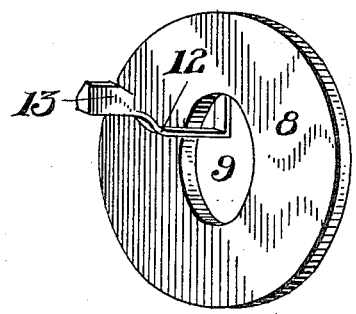

Figure 1 is a longitudinal sectional view of a nut locking device in accordance with this invention, Fig. 2 is an end view of the same, and Fig. 3 is a perspective view of a detached locking washer.

The reference numerals 1 and 2 denote, by the way of an example, two pieces of material having alining openings 3 to receive a bolt 4. The head 5 of the bolt engages the outer side of the piece of material 2 and the threaded end 6 of the bolt protrudes from the opening 3 of the piece of material 1. The threaded end 6 of the bolt is provided with a longitudinal groove 7 that is rectangular in cross section.

The reference numeral 8 denotes a locking washer having a central opening 9 providing clearance for the threaded end 6 of the bolt 4. The rear face of this washer is provided with a radially disposed groove 10.

Mounted in the groove 7 of the bolt is the longitudinally extending body portion 12 of a resilient locking member, the latter further includes a right angular extension 11 which projects from the inner end of the body portion 12 and is seated in the groove 10 of the washer 8. The locking member further includes a curved outer portion which projects from the body portion 12, the said outer portion curving upwardly and terminating in a beveled tooth 13, the curving of the outer portion upwardly adds resiliency thereto.

The reference numeral 14 denotes a nut having a bore 15 with the walls of said bore screw threaded, whereby the nut can be screwed upon the threaded end 6 of the bolt against the washer 8. The outer side of the nut 14 is provided with ratchet teeth 16, these teeth being formed in the walls of the bore 15, at the outer end thereof. The teeth 16 are adapted to mesh with the tooth 13. That is, the tooth 13 is adapted to engage one of the teeth 16 to lock the nut 14 relatively to the bolt 4. The shape of the teeth 16 is such that the nut can be easily screwed upon the bolt against the washer 8, the tooth 13 receding as the nut is rotated upon the bolt. Immediately upon the nut being tightened against the washer 8, the tooth 13 prevents a rearward rotation of the nut 14, until the locking member 12 is depressed to release the nut 14. The groove 7 provides sufficient clearance for the tooth 13 and the locking member, when said tooth is manually shifted into the groove 7 to release the nut 14.

The washer need not necessarily be provided with the groove which is shown in the drawing for holding the spring locking member and this member may be made integral with the washer if desired.

It is thought that the utility of the nut locking device will be apparent without further description, and I would have it understood that the structural elements of my invention are susceptible to such variations as fall within the scope of the appended claim.

What I claim is:—

A nut locking device comprising the combination with a bolt having its threaded portion provided with a longitudinally extending groove, of a washer mounted upon said bolt and having its inner face provided with a longitudinally extending groove, a resilient locking member including a longitudinally extending body portion seated in the groove of the bolt and having projecting from its inner end a right-angular extension seated in the groove of the washer, said member further provided with an upwardly curved outer portion projecting from said body portion and terminating in a beveled tooth, and a nut mounted upon said bolt against said washer and having its outer face provided with teeth adapted to be engaged by said tooth, whereby the latter and said extension will prevent the turning of the nut and washer with respect to the bolt.

In testimony whereof I affix my signature in the presence of two witnesses.

ANDREW D. MILLER.

Witnesses:
MAX H. SROLOVITZ,
CHRISTINA T. HOOD.

Copies of this patent may be obtained for five cents each, by addressing the "Commissioner of Patents, Washington, D. C."